United States Patent
Huh et al.

(10) Patent No.: US 10,206,178 B2
(45) Date of Patent: Feb. 12, 2019

(54) METHODS AND APPARATUS FOR USING IRC RECEIVER SELECTIVELY BY A USER EQUIPMENT

(71) Applicant: LG ELECTRONICS INC., Seoul (KR)

(72) Inventors: Joongkwan Huh, Seoul (KR); Jaewook Song, Seoul (KR); Sukhyon Yoon, Seoul (KR); Kyuin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 15/389,360

(22) Filed: Dec. 22, 2016

(65) Prior Publication Data

US 2018/0110015 A1   Apr. 19, 2018

(30) Foreign Application Priority Data

Oct. 14, 2016   (KR) ......... 10-2016-0133447

(51) Int. Cl.
*H04B 7/04* (2017.01)
*H04W 52/24* (2009.01)
*H04B 7/0413* (2017.01)
*H04J 11/00* (2006.01)

(52) U.S. Cl.
CPC ........ *H04W 52/243* (2013.01); *H04B 7/0413* (2013.01); *H04J 11/005* (2013.01)

(58) Field of Classification Search
CPC ..... H04B 7/0413; H04B 7/0854; H04L 27/22; H04W 24/02; H04W 24/08; H04W 92/16; H04W 92/18; H04W 92/20
See application file for complete search history.

(56) References Cited

U.S. PATENT DOCUMENTS

| | | | | |
|---|---|---|---|---|
| 2013/0114451 A1* | 5/2013 | Al-Dhahir | ............ | H04B 7/0413 370/252 |
| 2014/0064106 A1* | 3/2014 | Balraj | ................ | H04W 24/10 370/252 |
| 2014/0334579 A1* | 11/2014 | Lincoln | ................ | H04L 25/067 375/346 |
| 2016/0157243 A1* | 6/2016 | Janis | ................ | H04J 11/0056 370/329 |

* cited by examiner

*Primary Examiner* — Mohamed A Kamara
(74) *Attorney, Agent, or Firm* — Lee, Hong, Degerman, Kang & Waimey

(57) ABSTRACT

Provided are a method of selectively using an interference rejection combining (IRC) receiver by a user equipment (UE) in a wireless communication system, and an apparatus supporting the same. The UE may calculate a dominant interferer proportion (DIP) estimation parameter based on a covariance matrix, may estimate a DIP based on the DIP estimation parameter, and may determine whether to use the IRC receiver based on the estimated DIP and a DIP threshold.

18 Claims, 14 Drawing Sheets

(a)

(b)

METHODS AND APPARATUS FOR USING IRC RECEIVER SELECTIVELY BY A USER EQUIPMENT

CROSS-REFERENCE TO RELATED APPLICATIONS

Pursuant to 35 U.S.C. § 119(a), this application claims the benefit of earlier filing date and right of priority to Korean Patent Application No. 10-2016-0133447, filed on Oct. 14, 2016, the contents of which are hereby incorporated by reference herein in its entirety.

BACKGROUND OF THE INVENTION

Field of the Invention

The present invention relates to a wireless communication system, and more particularly, to a method for a user equipment to selectively use an interference rejection combining (IRC) receiver in a wireless communication system, and an apparatus for supporting the same.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. The 3GPP LTE adopts MIMO (multiple input multiple output) having maximum four antennas. In recent years, there is an ongoing discussion on 3GPP LTE-advanced (LTE-A) that is an evolution of the 3GPP LTE.

Since the introduction of wireless Internet services in earnest from third-generation mobile communication, the spread of smartphones in recent times facilitate the use of wireless Internet and various kinds of wireless content using WiFi at affordable prices, and thus wireless data traffic has been drastically increased. To meet the demand for wireless data traffic, there are considered a massive multi-input and multi-output (MIMO) technique using an increasing number of physical transmission antennas, carrier aggregation (CA) that additionally allocates a frequency spectrum to increase a bandwidth, and a method of disposing a large number of small cells with a reduced size.

Among these methods, the method using small cells involves an interference problem between adjacent cells with an increase in the number of small cells, and thus 3GPP provides further enhanced inter-cell interference coordination (FeICIC) and coordinated multipoint transmission/reception (CoMP), which use network cooperation, in order to reduce such interference and increase network capacity. FeICIC is a method in which a macrocell causing interference does not allocate data in a designated subframe but offloads a UE onto a small cell so that the UE receives data transmission in the small cell to increase overall cell capacity. However, this technique is a method for avoiding interference in a network, not for basically removing interference.

A 3GPP radio access network (RAN) defines a standard for a receiver capable of directly controlling or eliminating interference in a cell or between cells to basically eliminate interference, thereby aiming at an increase in system capacity. Receivers relating to interference elimination may include a Type 3i Interference Rejection Combining (IRC) receiver that is capable of eliminating inter-cell interference through a linear equalizer in UMTS and HSDPA, an IRC receiver in which a CDMA interference control receiver in UMTS is applied in an extended manner to an OFDM-MIMO receiver in LTE so that substantially the same concept is applied, and a non-linear Interference Cancellation (IC) receiver that eliminates a synchronization signal, a broadcasting channel, and a reference signal (RS) from an interfering cell.

In the extension of evolving UE receivers, 3GPP Rel-12 has standardized a Network Assistance Interference Cancellation and Suppression (NAICS) receiver, which is capable of eliminating data and control signals from an interfering cell.

SUMMARY OF THE INVENTION

In a strong interference environment, an interference rejection combining (IRC) receiver may have a superior performance to that of a maximum ratio combining (MRC) receiver or minimum mean square error (MMSE) receiver. However, using the IRC receiver may increase the overall complexity of the receiver as compared with not using the IRC receiver. Accordingly, the power consumption of the UE may be increased. Furthermore, when the IRC receiver is used, the UE has no performance gain or may rather suffer deterioration in performance in an environment with a low interference ratio, as compared with when no IRC receiver is used. Therefore, to minimize the power consumption of the UE and to prevent deterioration in the reception performance of the receiver, the UE needs to dynamically use the URC receiver according to the performance gain of the IRC receiver.

According to an embodiment, there is provided a method of selectively using an interference rejection combining (IRC) receiver by a user equipment (UE) in a wireless communication system. The UE may calculate a dominant interferer proportion (DIP) estimation parameter based on a covariance matrix, may estimate a DIP based on the DIP estimation parameter, and may determine whether to use the IRC receiver based on the estimated DIP and a DIP threshold.

The DIP estimation parameter may be the ratio between the power of diagonal elements in the covariance matrix and the power of off-diagonal elements in the covariance matrix. The DIP estimation parameter may be defined by the following equation.

$$DIP \text{ estimation parameter} = \frac{\text{power of off-diagonal elements in covariance matrix}}{\text{power of diagonal elements in covariance matrix}}$$

When the covariance matrix is $$\begin{bmatrix} r_{00} & r_{01} \\ r_{10} & r_{11} \end{bmatrix},$$

the power of diagonal elements may be $r_{00} \cdot r_{11}$ and the power of off-diagonal elements may be $|r_{01}|^2$. When the covariance matrix is $$\begin{bmatrix} r_{00} & r_{01} & r_{02} \\ r_{10} & r_{11} & r_{12} \\ r_{20} & r_{21} & r_{22} \end{bmatrix},$$

the power of diagonal elements may be $r_{00} \cdot r_{11} + r_{00} \cdot r_{22}$ and the power of off-diagonal elements may be $|r_{01}|^2 + |r_{02}|^2 + |r_{12}|^2$. When the covariance matrix is $$\begin{bmatrix} r_{00} & r_{01} & r_{02} & r_{03} \\ r_{10} & r_{11} & r_{12} & r_{13} \\ r_{20} & r_{21} & r_{22} & r_{23} \\ r_{30} & r_{31} & r_{32} & r_{33} \end{bmatrix},$$

the power of diagonal elements may be $r_{00} \cdot r_{11} + r_{00} \cdot r_{22} + r_{00} \cdot r_{33} + r_{11} \cdot r_{22} + r_{11} \cdot r_{33}$ and the power of off-diagonal elements may be $|r_{01}|^2 + |r_{02}|^2 + |r_{03}|^2 + |r_{12}|^2 + |r_{13}|^2 + |r_{23}|^2$.

When the estimated DIP is the DIP threshold or less, the UE may determine not to use the IRC receiver. When the estimated DIP is higher than the DIP threshold, the UE may determine to use the IRC receiver.

The DIP estimation parameter and the DIP may have a relationship of a one-to-one function.

The DIP threshold may be adjusted variously.

According to another embodiment, there is provided a UE for selectively using an IRC receiver in a wireless communication system. The UE may include a memory; a transceiver; and a processor, connecting the memory and the transceiver. The processor may calculates a DIP estimation parameter based on a covariance matrix, may estimate a DIP based on the DIP estimation parameter, and may determine whether to use the IRC receiver based on the estimated DIP and a DIP threshold.

The UE may dynamically use an IRC receiver.

DESCRIPTION OF EXEMPLARY EMBODIMENTS

The following technology may be used in various wireless communication systems, such as code division multiple access (CDMA), frequency division multiple access (FDMA), time division Multiple access (TDMA), orthogonal frequency division multiple access (OFDMA), and single carrier frequency division multiple access (SC-FDMA). CDMA may be realized as a radio technology including universal terrestrial radio access (UTRA) or CDMA2000. TDMA may be realized as a radio technology including global system for mobile communications (GSM)/ general packet radio service (GPRS)/enhanced data rates for GSM evolution (EDGE). OFDMA may be realized as a radio technology including IEEE 802.11 (Wi-Fi), IEEE 802.16 (WiMAX), IEEE 802-20, and E-UTRA (evolved UTRA). IEEE 802.16m is an evolution of IEEE 802.16e and provides backward compatibility with a system based on IEEE 802.16e. UTRA is part of a universal mobile telecommunications system (UMTS). 3rd generation partnership project (3GPP) long term evolution (LTE) is part of an evolved UMTS (E-UMTS) using evolved-UMTS terrestrial radio access (E-UTRA) and employs OFDMA for a downlink and SC-FDMA for an uplink. LTE-advanced (LTE-A) is an evolution of 3GPP LTE.

Although the following description is made with reference to LTE-A for clarity, the technical idea of the present invention is not limited thereto.

Figure 1:
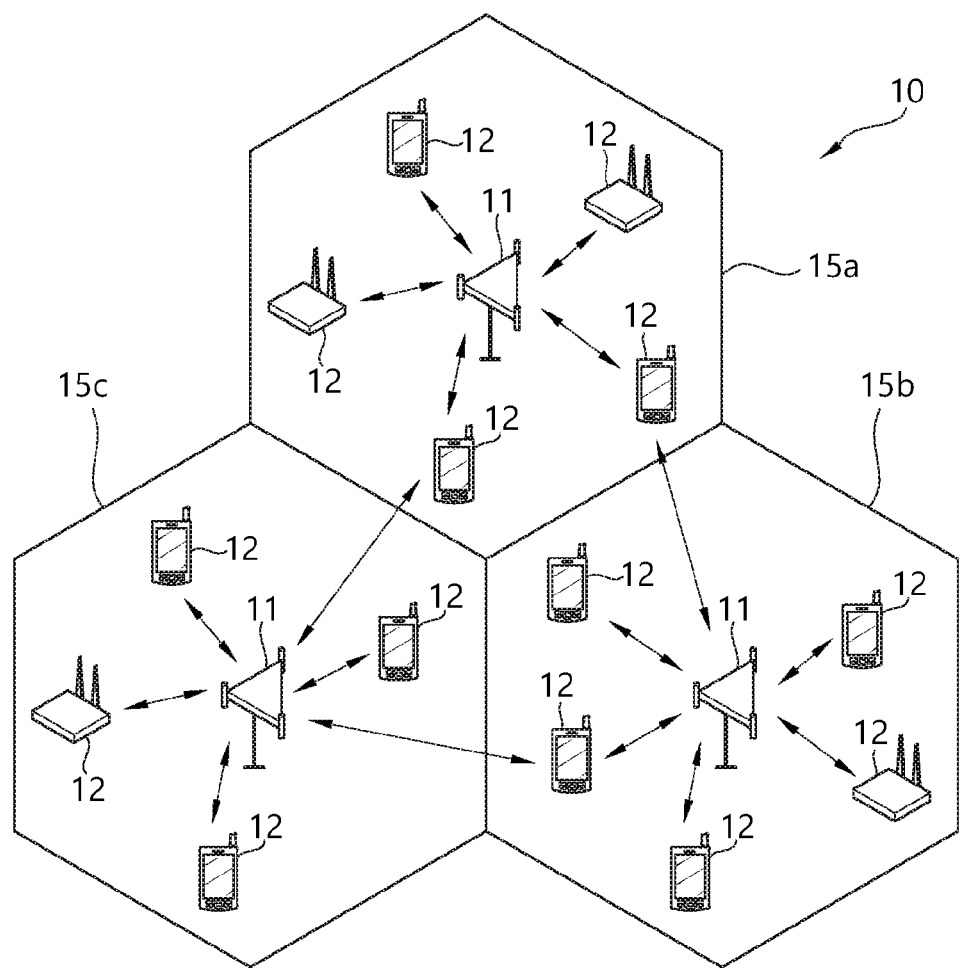
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
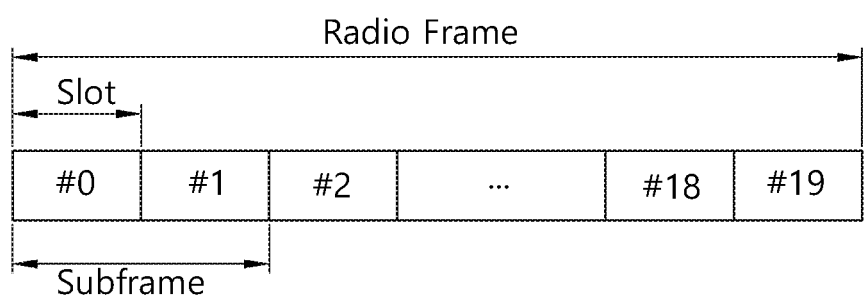
FIG. 2 shows a structure of a radio frame in 3GPP LTE.

FIG. 2 shows a structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Figure 3:
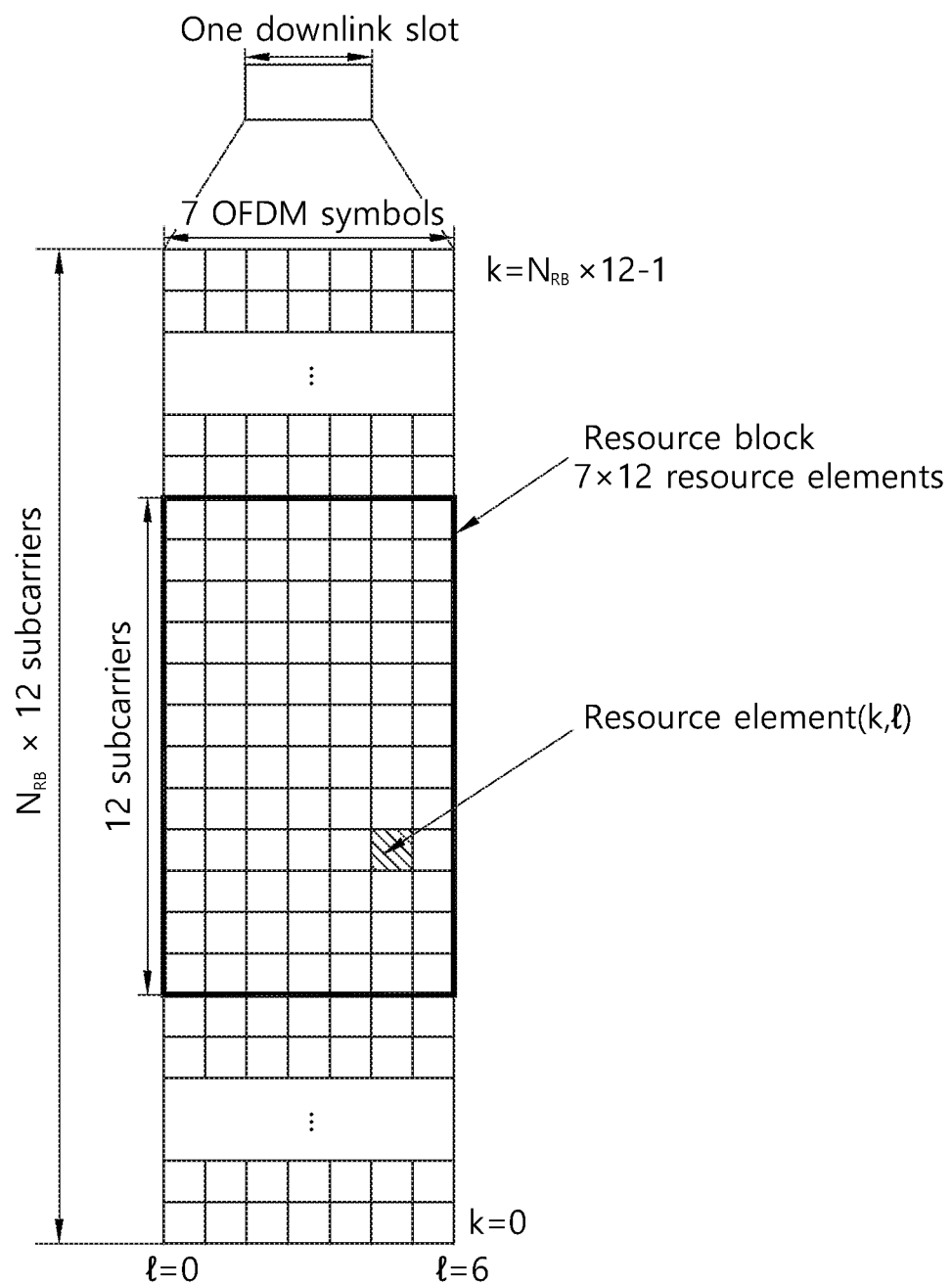
FIG. 3 shows an example of a resource grid of a single downlink slot.

FIG. 3 shows an example of a resource grid of a single downlink slot.

A downlink slot includes a plurality of OFDM symbols in the time domain and NRB number of resource blocks (RBs) in the frequency domain. The NRB number of resource blocks included in the downlink slot is dependent upon a downlink transmission bandwidth set in a cell. For example, in an LTE system, NRB may be any one of 6 to 110. One resource block includes a plurality of subcarriers in the frequency domain. An uplink slot may have the same structure as that of the downlink slot.

Each element on the resource grid is called a resource element. The resource elements on the resource grid can be identified by a pair of indexes (k,l) in the slot. Here, k (k=0, . . . , NRB×12-1) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
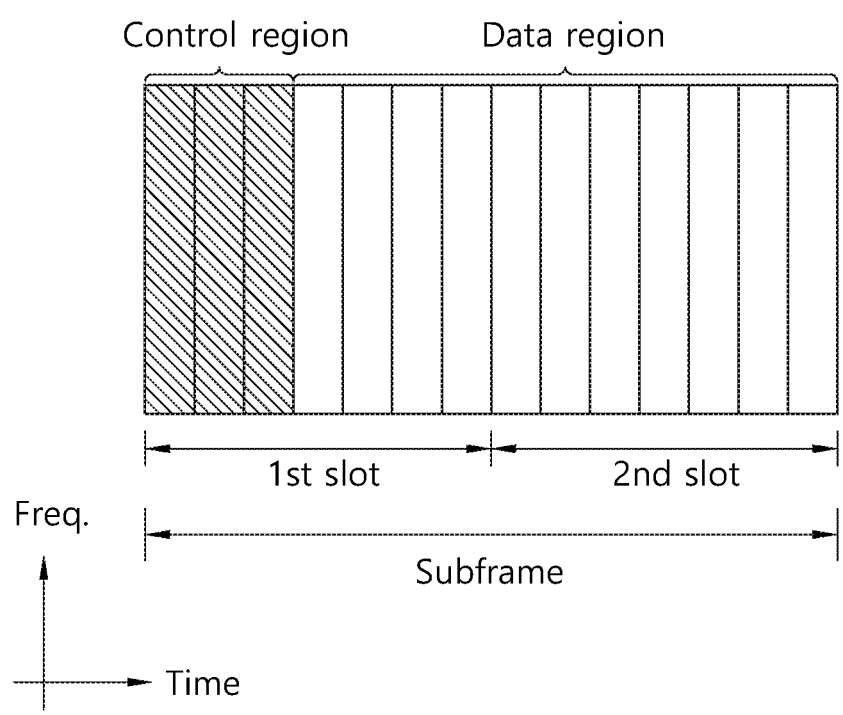
FIG. 4 shows a structure of a downlink subframe.

FIG. 4 shows a structure of a downlink subframe.

A downlink subframe includes two slots in the time domain, and each of the slots includes seven OFDM symbols in the normal CP. First three OFDM symbols (maximum four OFDM symbols for a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to downlink control information (DCI) to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
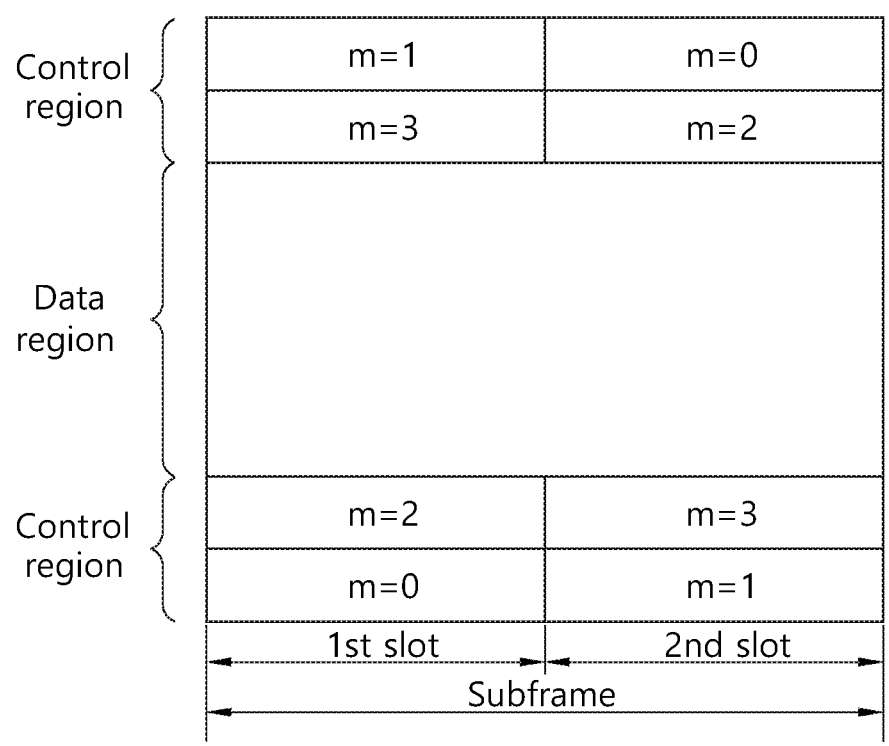
FIG. 5 shows a structure of an uplink subframe.
Figure 5:
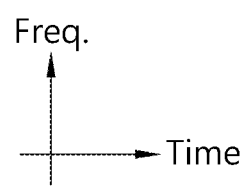

FIG. 5 shows a structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH for a UE is allocated by a pair of RBs in a subframe. The resource blocks belonging to the pair of RBs occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Figure 6:
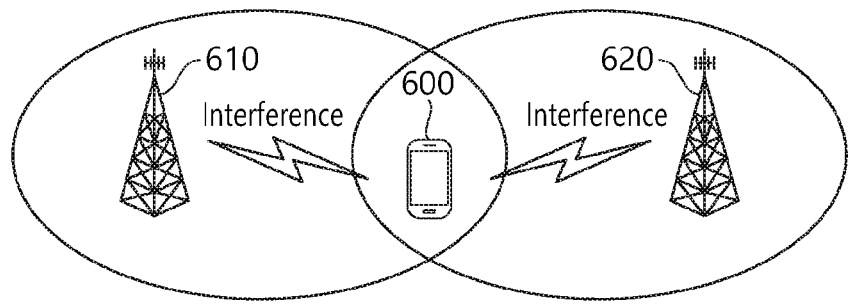
FIG. 6 illustrates an inter-cell interference problem and enhanced inter-cell interference coordination (eICIC) for solving the inter-cell interference problem.
Figure 6:
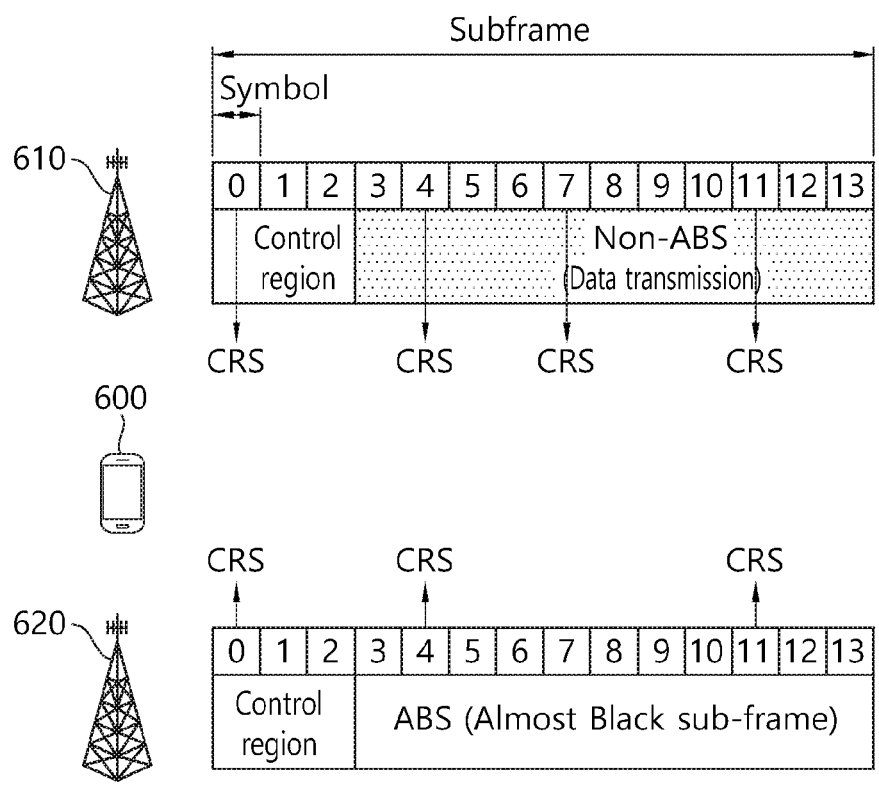

FIG. 6 illustrates an inter-cell interference problem and enhanced inter-cell interference coordination (eICIC) for solving the inter-cell interference problem. Specifically, FIG. 6(a) illustrates the inter-cell interference problem, and FIG. 6(b) illustrates eICIC for solving the inter-cell interference problem.

Referring to FIG. 6(a), when a UE 600 is located in an overlapping area of the coverage of a first cell 610 and the coverage of a second cell 620, a signal of the first cell may act as interference to a signal of the second cell. On the contrary, a signal of the second cell may act as interference to a signal of the first cell. A basic method for solving such an interference problem is using different frequencies for the cells. However, since a frequency is a sparse and expensive resource, service providers do not favor a solution using frequency division. Therefore, the 3GPP attempts to solve the inter-cell interference problem using time division. To this end, the 3GPP suggests eICIC as an interference coordination method.

A time division method introduced in Rel-10 is called eICIC in that the method has been advanced as compared with the existing frequency division method. In eICIC, a cell causing interference may be defined as an aggressor cell, and a cell receiving interference as a victim cell. eICIC is a method in which an aggressor cell suspends data transmission in a specific frame so that a UE maintains connection to the victim cell in the subframe. That is, according to this method, when heterogeneous cells coexist, one cell temporarily suspends transmitting a signal to a UE having substantially high interference in an area, thus hardly sending an interference signal.

Meanwhile, the specific subframe in which data transmission is suspended may be referred to as an almost blank subframe (ABS). No data but essential control information may be transmitted in a subframe corresponding to an ABS. For example, the essential control information is a cell-specific reference signal (CRS). Therefore, in a subframe defined as an ABS, no data is transmitted but only a CRS may be transmitted on symbols 0, 4, 7, and 11.

Referring to FIG. 6(b), the UE may perform data transmission in a data region of a subframe of the first cell. Here, the second cell may apply eICIC in order to solve interference. That is, when eICIC is applied, the subframe is managed as an ABS, and no data may be transmitted in the data region. Here, only a CRS may be transmitted on symbols 0, 4, 7, and 11 in the subframe managed as the ABS.

In Rel-11, as a further extension of eICIC, a new further enhanced inter-cell interference coordination (FeICIC) function has been added that enables cell range extension (CRE) up to 9 dB. In FeICIC, a signal with received power up to 9 dB greater than fom a serving cell may be transmitted from an interfering cell.

Meanwhile, in a next-generation mobile communication system, a small cell with a small cell coverage radius may be added within the coverage of the existing cell. Furthermore, the small cell is expected to process greater traffic. The existing cell has wider coverage than the small cell and thus may be referred to as a macrocell.

Hereinafter, a heterogeneous network is described.

Figure 7:
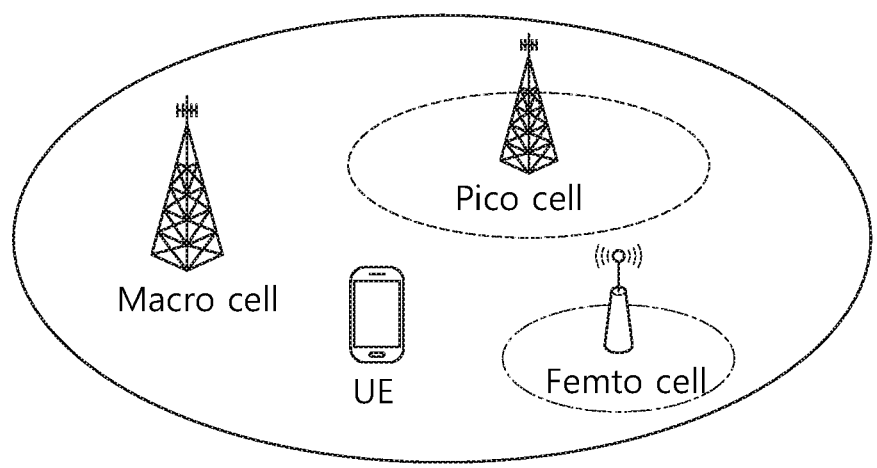
FIG. 7 illustrates an example of a heterogeneous network.

FIG. 7 illustrates an example of a heterogeneous network (HetNet).

Referring to FIG. 7, the heterogeneous network is a network in which different kinds of cells are disposed and managed. In the heterogeneous network, a large number of nodes are overlapping, for example, a picocell, a microcell, a femtocell, or a home eNB. Although the uses of small cells are not limited, a picocell may be generally installed in an area with a high demand for data services, a femtocell may be installed in an indoor office or home, and a radio repeater may be installed to supplement the coverage of a macrocell. Further, small cells may be classified according to access restriction into a closed subscriber group (CSG) available only for a specific user, an open access allowed for access by a general user, and a hybrid access using these two methods in combination.

In the heterogeneous network, the macrocell may be set as a primary cell (Pcell), and a small cell may be set as a secondary cell (Scell), thereby supplementing a loophole of the coverage of the macrocell. Further, the small cell may be set as a primary cell (Pcell), and the macrocell may be set as a secondary cell (Scell), thereby boosting overall performance. However, the introduction of a small cell may aggravate inter-cell interference. That is, in eICIC or FeICIC, although most signals transmitted via an ABS are empty, a CRS, a physical broadcasting channel (PBCH), a sync channel (SCH), and a physical downlink shared channel (PDSCH), which are basic to the operation of an LTE network, may be still introduced from an interfering cell.

As described above, inter-cell interference may cause deterioration in the performance of a UE. Inter-cell interference may be a problem on the edge of a cell or in a heterogeneous network environment. In this case, when an interference rejection combining (IRC) receiver that suppresses interference is used, the performance of a UE may be improved on the edge of a cell or in a heterogeneous network environment.

Hereinafter, an IRC receiver is described.

A multi-input and multi-output (MIMO) system having M transmitting antennas and N receiving antennas may be represented by Equation 1.

$$r = Hs + n + t \quad \text{[Equation 1]}$$

r may be a received symbol vector, s may be a transmitted symbol vector, n may be an additive white Gaussian noise (AWGN) vector, t may be an interference vector by a neighboring cell, and H may be an N×M channel matrix. r may be represented by $[r1, r2, \ldots, rN]^T$, s may be represented by $[s1, s2, \ldots, sM]^T$, n may be represented by $[n1, n2, \ldots, nN]^T$, and t may be represented by $[t1, t2, \ldots, tN]^T$.

A covariance matrix of interference and noise may be represented by Equation 2.

$$R = E\{(n+t)(n+t)^H\} \quad \text{[Equation 2]}$$

R may be a covariance matrix, n is an AWGN vector, and t may be an interference vector by a neighboring cell. n may be represented by $[n1, n2, \ldots, nN]^T$, and t may be represented by $[t1, t2, \ldots, tN]^T$.

(1) In Case of Maximum Ratio Combining (MRC) Receiver

In a single-input multiple-output (SIMO) case, before an IRC receiver is applied, an MRC receiver may be defined by Equation 3.

$$\hat{s}_{MRC} = \hat{H}^H r \quad \text{[Equation 3]}$$

$\hat{s}_{MRC}$ may be an MRC estimate of a transmitted symbol, $\hat{H}$ may be an estimate of an N×M channel matrix, and r may be a received symbol vector.

After an IRC receiver, the MCR receiver may be defined by Equation 4.

$$\hat{s}_{MRC} = \hat{H}^H R^{-1} r \quad \text{[Equation 4]}$$

$\hat{s}_{MRC}$ may be an MRC estimate of a transmitted symbol, $\hat{H}$ may be an estimate of an N×M channel matrix, R is the covariance matrix defined by Equation 2, and r may be a received symbol vector.

(2) In Case of Minimum Mean Square Error (MMSE) Receiver

MMSE is a general method for interference elimination, in which interference is regarded as white noise. In a MIMO case, before an IRC receiver is applied, an MMSE receiver may be defined by Equation 5.

$$\hat{s}_{MMSE} = \hat{H}^H (\hat{H} \hat{H}^H + \sigma^2 I)^{-1} r \quad \text{[Equation 5]}$$

$\hat{s}_{MMSE}$ may be an MMSE estimate of a transmitted symbol, $\hat{H}$ may be an estimate of an N×M channel matrix, I may be an N×M identity matrix, $\sigma^2$ may be the sum of average interference and noise power, and r may be a received symbol vector.

After an IRC receiver, the MMSE receiver may be defined by Equation 6.

$$\hat{s}_{MMSE} = \hat{H}^H (\hat{H} \hat{H}^H + R)^{-1} r \quad \text{[Equation 6]}$$

$\hat{s}_{MMSE}$ may be an MMSE estimate of a transmitted symbol, $\hat{H}$ may be an estimate of an N×M channel matrix, R is the covariance matrix defined by Equation 2, and r may be a received symbol vector.

The aforementioned equations for the IRC receiver are only illustrative examples and may be modified at actual implementation. In a strong interference environment, the IRC receiver may have a superior performance to that of an MRC receiver or MMSE receiver. However, using the IRC receiver may increase the overall complexity of the receiver as compared with not using the IRC receiver. Accordingly, the power consumption of the UE may be increased. Furthermore, when the IRC receiver is used, the UE has no performance gain or may rather suffer deterioration in performance in an environment with a low interference ratio, as compared with when no IRC receiver is used. Therefore, to minimize the power consumption of the UE and to prevent deterioration in the reception performance of the receiver, it is needed to detect an environment in which the IRC receiver has no performance gain. To this end, it is necessary to estimate an environment in which the IRC receiver has no performance gain. The UE needs to use no IRC receiver in an environment with no performance gain of the IRC receiver and needs to use the IRC receiver in other cases. Therefore, it is necessary to suggest a method for dynamically using the IRC receiver.

Hereinafter, described is a method of dynamically using an IRC receiver based on dominant interferer proportion (DIP) according to an embodiment of the present invention.

Figure 8:
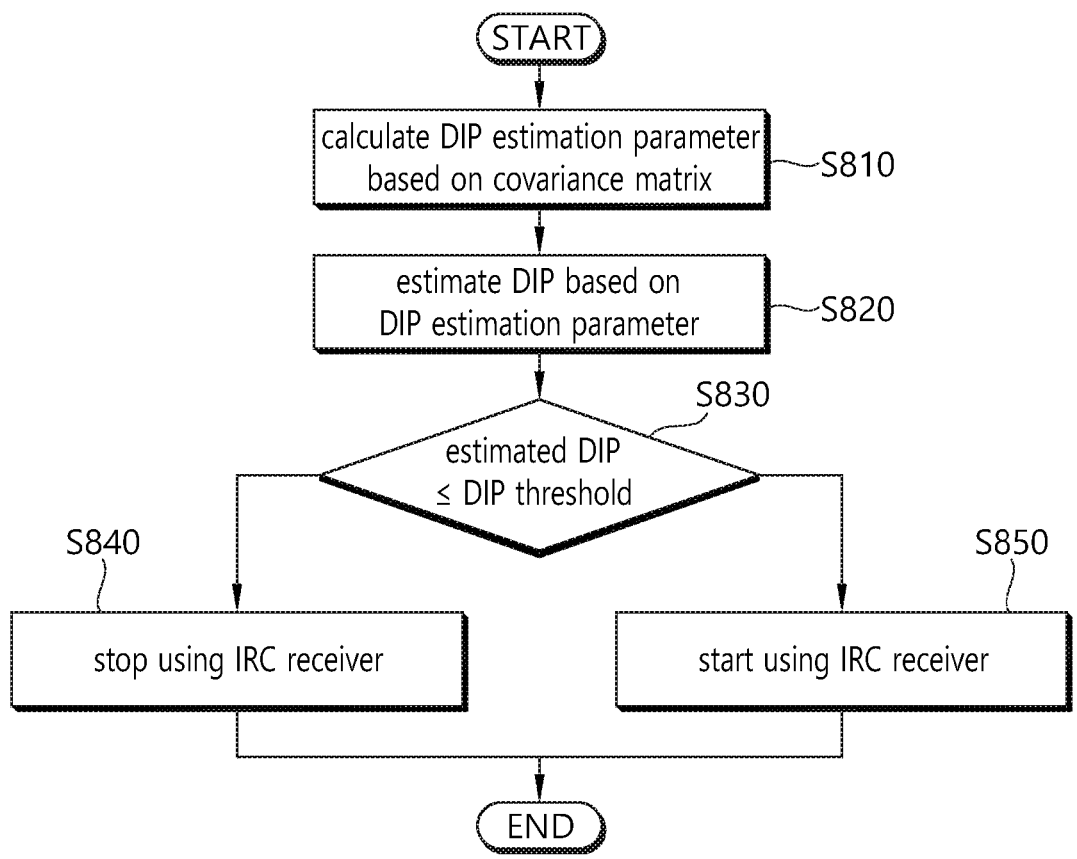
FIG. 8 illustrates a method for a UE to dynamically use an IRC receiver based on a DIP according to an embodiment of the present invention.

FIG. 8 illustrates a method for a UE to dynamically use an IRC receiver based on a DIP according to an embodiment of the present invention.

Referring to FIG. 8, in operation S810, the UE may calculate a DIP estimation parameter based on a covariance matrix. The covariance matrix may be a Hermitian matrix. The DIP estimation parameter may be defined as the ratio between the power of diagonal elements in the covariance matrix and the power of off-diagonal elements in the covariance matrix. The DIP estimation parameter may be defined by Equation 7.

$$DIP \text{ estimation parameter} = \frac{y}{x} \quad \text{[Equation 7]}$$

x may be the power of diagonal elements in the covariance matrix and y may be the power of off-diagonal elements in the covariance matrix.

For example, when the covariance matrix is $$\begin{bmatrix} r_{00} & r_{01} \\ r_{10} & r_{11} \end{bmatrix},$$

the power of diagonal elements may be $r_{00} \cdot r_{11}$ and the power of off-diagonal elements may be $|r_{01}|^2$.

For example, when the covariance matrix is $$\begin{bmatrix} r_{00} & r_{01} & r_{02} \\ r_{10} & r_{11} & r_{12} \\ r_{20} & r_{21} & r_{22} \end{bmatrix},$$

the power of diagonal elements may be $r_{00} \cdot r_{11} + r_{00} \cdot r_{22} + r_{11} \cdot r_{22}$ and the power of off-diagonal elements may be $|r_{01}|^2 + |r_{02}|^2 + |r_{12}|^2$.

For example, when the covariance matrix is $$\begin{bmatrix} r_{00} & r_{01} & r_{02} & r_{03} \\ r_{10} & r_{11} & r_{12} & r_{13} \\ r_{20} & r_{21} & r_{22} & r_{23} \\ r_{30} & r_{31} & r_{32} & r_{33} \end{bmatrix},$$

the power of diagonal elements may be $r_{00} \cdot r_{11} + r_{00} \cdot r_{22} + r_{00} \cdot r_{33} + r_{11} \cdot r_{22} + r_{11} \cdot r_{33} + r_{22} \cdot r_{33}$ and the power of off-diagonal elements may be $|r_{01}|^2 + |r_{02}|^2 + |r_{03}|^2 + |r_{12}|^2 + |r_{13}|^2 + |r_{23}|^2$.

Although 2×2, 3×3, and 4×4 covariance matrices have been illustrated for the convenience of description, these matrices are provided merely for illustrative purposes and do not limit the technical scope of the present invention.

Referring to FIG. 8, in operation S820, the UE may estimate a DIP based on the DIP estimation parameter. The covariance matrix may be a Hermitian matrix, and the DIP estimation parameter increases with a higher DIP. That is, as the DIP increases, the ratio between the power of diagonal elements in the covariance matrix and the power of off-diagonal elements in the covariance matrix may increase.

Figure 9:
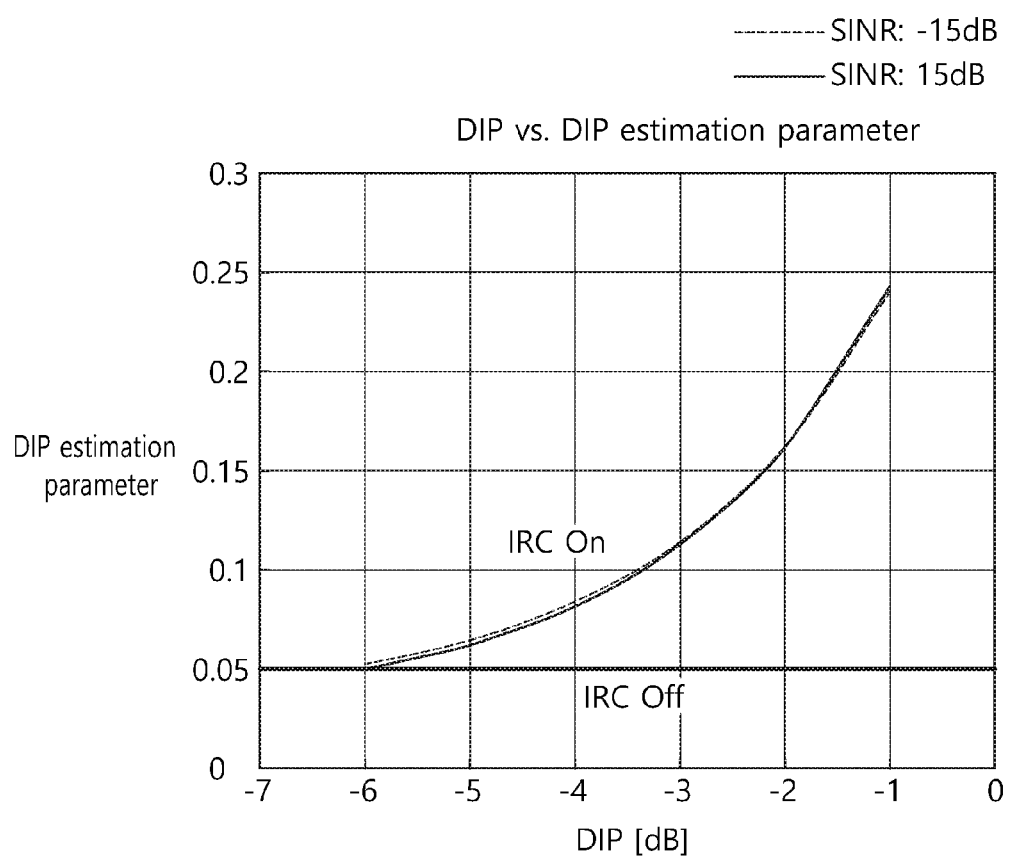
FIG. 9 illustrates a relationship between a DIP and a DIP estimation parameter according to an embodiment of the present invention.

FIG. 9 illustrates a relationship between a DIP and a DIP estimation parameter according to an embodiment of the present invention.

Referring to FIG. 9, when an IRC receiver is on, the DIP and the DIP estimation parameter has a relationship of a one-to-one function regardless of an SINR. For instance, a correlation between the DIP and the DIP estimation parameter at an SINR=−15 [dB] is the same as a correlation between the DIP and the DIP estimation parameter at an SINR=+15 [dB]. Therefore, when the DIP estimation parameter is calculated, a DIP value corresponding to the DIP estimation parameter may be estimated. For example, when the calculated DIP estimation parameter is 0.05, the DIP may be estimated to be −6 [dB]. For example, when the calculated DIP estimation parameter is 0.1, the DIP may be estimated to be −3.4 [dB]. For example, when the calculated DIP estimation parameter is 0.15, the DIP may be estimated to be −2.2 [dB]. For example, when the calculated DIP estimation parameter is 0.24, the DIP may be estimated to be −1 [dB].

Referring to FIG. 8, in operation S830, the UE may compare the estimated DIP with a DIP threshold to determine whether to use the IRC receiver. When the estimated DIP is the DIP threshold or less, the UE may determine not to use the IRC receiver in operation S840. Accordingly, using the IRC receiver may be stopped. When the estimated DIP is higher than the DIP threshold, the UE may determine to use the IRC receiver in operation S850. Accordingly, using the IRC receiver may be started. The DIP threshold may be received from a network. The DIP threshold may be adjusted variously. Hereinafter, a method of setting a DIP threshold is described.

Figure 10A:
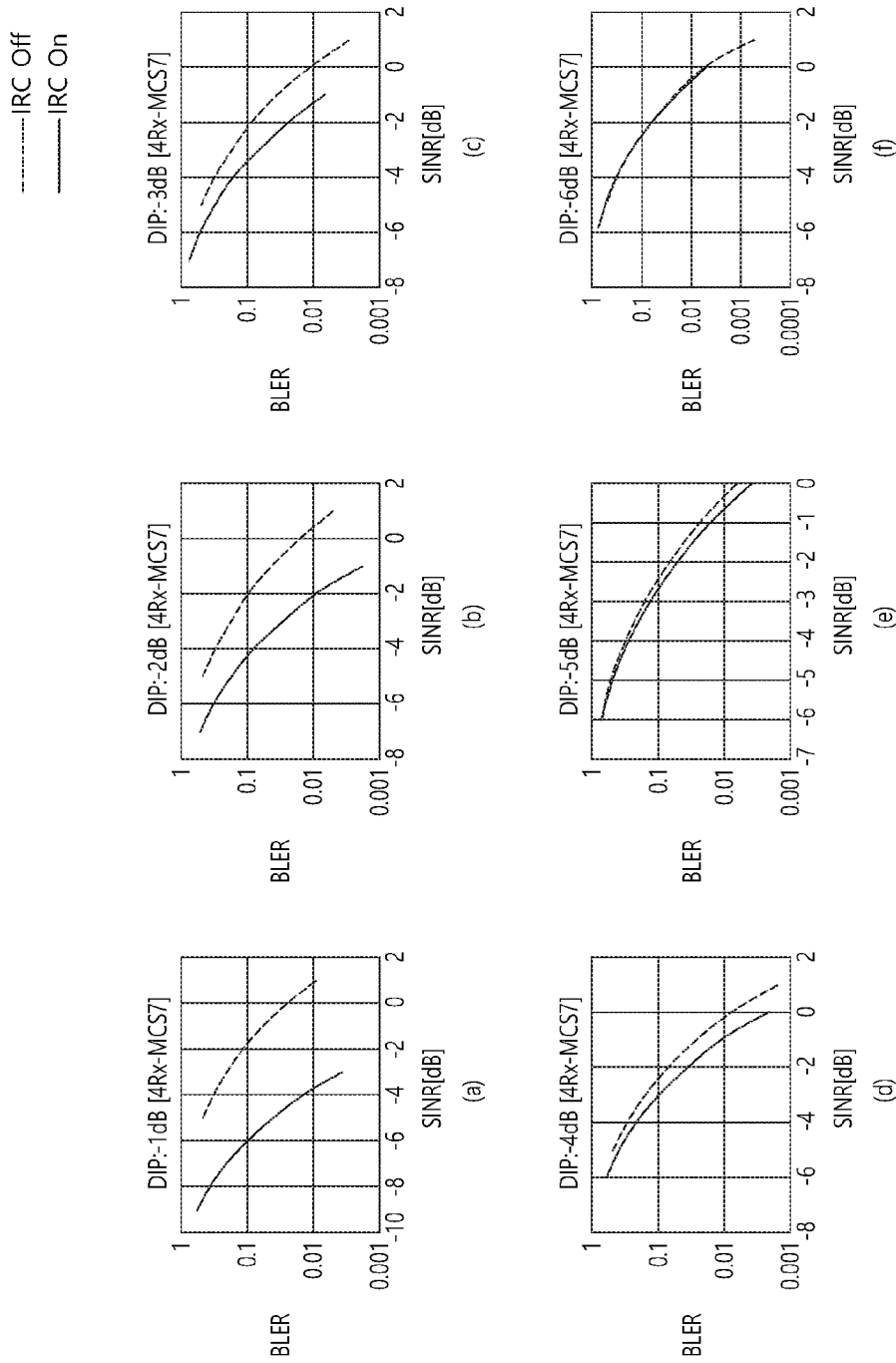
FIG. 10a, FIG. 10b and FIG. 10c illustrate the performance gain of an IRC receiver in various simulation environments according to an embodiment of the present invention.
Figure 10B:
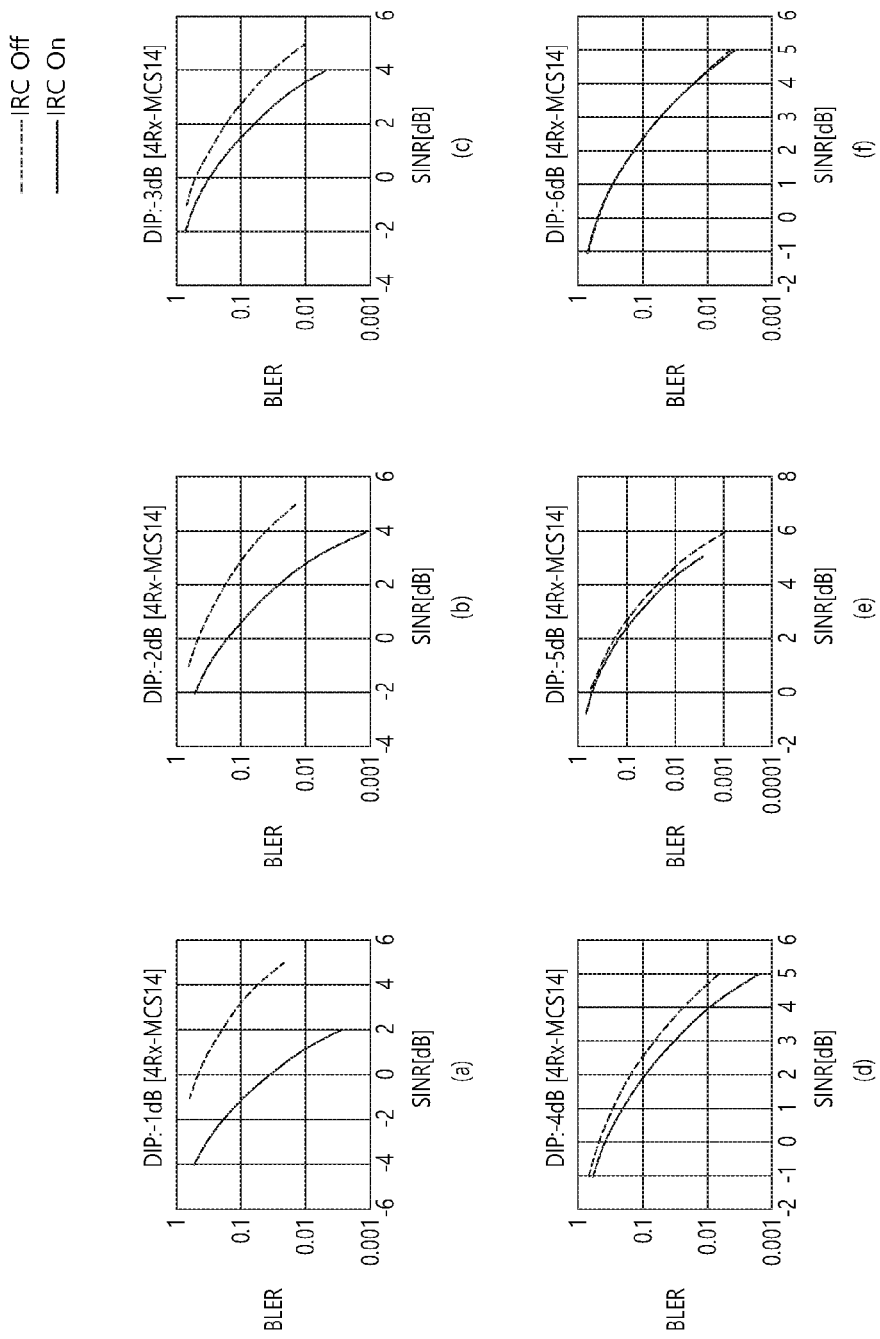
Figure 10C:
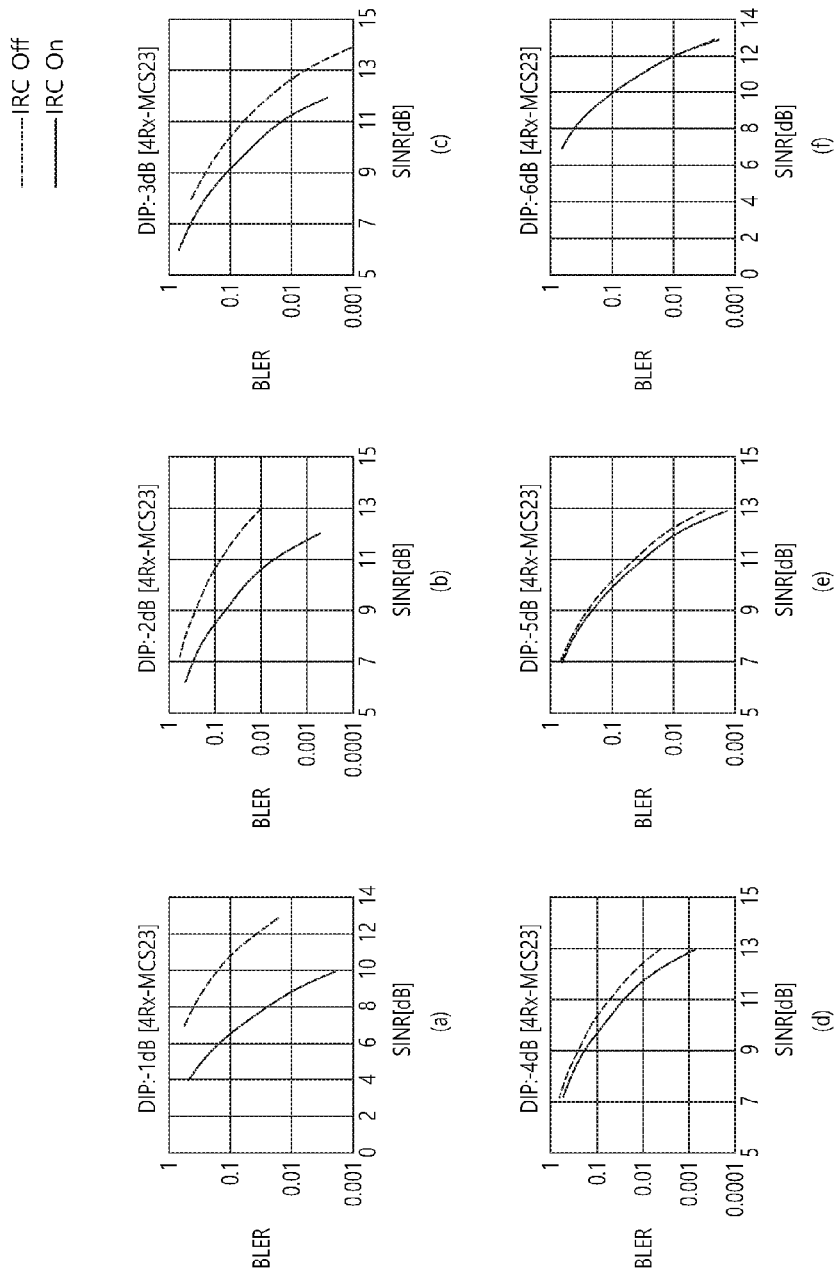

FIG. 10a, FIG. 10b and FIG. 10c illustrate the performance gain of an IRC receiver in various simulation environments according to an embodiment of the present invention. FIG. 10a illustrates the performance gain of the IRC receiver in the case of 4Rx-MCS7, N=4, M=2, and extended pedestrian A model (EPA) 5 channel, FIG. 10b illustrates the performance gain of the IRC receiver in the case of 4Rx-MCS14, N=4, M=2, and EPA5 channel, and FIG. 10c illustrates the performance gain of the IRC receiver in the case of 4Rx-MCS23, N=4, M=2, and EPA5 channel. MCS7, MCS14 and MCS23 are disclosed in Table 7.1.7.1-1 (Modulation and TBS index table for PDSCH) of 3GPP TS 36.213 V12.5.0 (2015-03). N denotes a row of a channel, and M denotes a column of the channel.

FIGS. 10a to 10c show that as the DIP decreases (that is, decrease from −1 dB to −6 dB), the performance gain of the IRC receiver decreases. Moreover, when the DIP is −6 dB, the IRC receiver hardly has a performance gain. Here, the DIP may be defined by Equation 8.

$$DIP = 10 \log \frac{\text{interference power}}{\text{interference power} + \text{noise power}} \quad \text{[Equation 8]}$$

Therefore, in order to reduce the power consumption of the UE due to the operation of the IRC receiver, it may be preferable not to operate the IRC receiver in an environment where no performance gain of the IRC receiver is expected. For example, when the DIP is −6 dB or less, it is preferable that the IRC receiver does not operate, and thus the DIP threshold may need to be set to −6 dB. Here, setting the DIP threshold to −6 dB is merely an embodiment, and the DIP threshold may be variable depending on purposes.

For example, when the DIP threshold is set to −6 dB and the estimated DIP is −6 dB or less, the UE may determine not to use the IRC receiver. When the DIP threshold is set to −6 dB and the estimated DIP is higher than −6 dB, the UE may determine to use the IRC receiver.

For example, when the DIP threshold is set to −5.7 dB and the estimated DIP is −5.7 dB or less, the UE may determine not to use the IRC receiver. When the DIP threshold is set to −5.7 dB and the estimated DIP is higher than −5.7 dB, the UE may determine to use the IRC receiver.

According to the technical idea of the present invention, the UE may calculate a DIP estimation parameter based on a covariance matrix regardless of an SINR and may estimate a DIP based on the calculated DIP estimation parameter, thereby variably determining whether to operate an IRC receiver. Therefore, there may be prevented the excessive power consumption of the UE that may occur when the UE uses an IRC receiver even in an environment where the IRC receiver has no performance gain.

Figure 11:
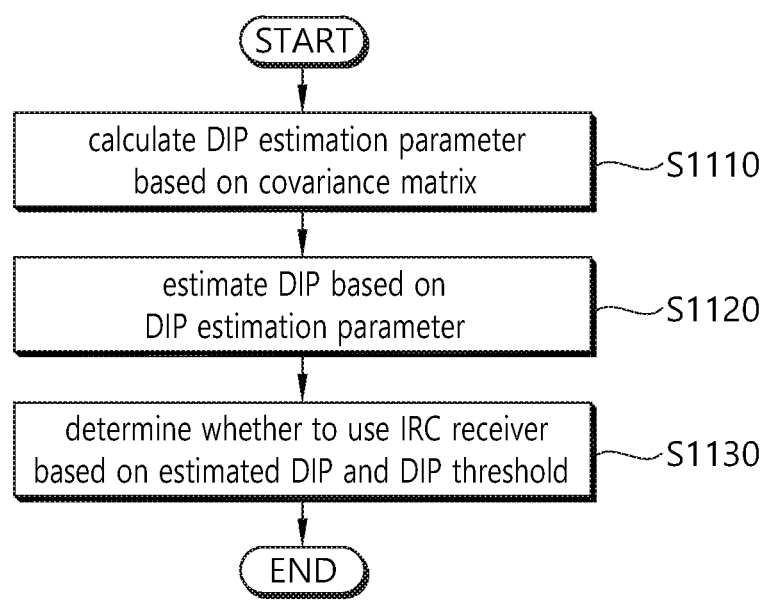
FIG. 11 is a block diagram illustrating a method for a UE to selectively use an IRC receiver according to an embodiment of the present invention.

FIG. 11 is a block diagram illustrating a method for a UE to selectively use an IRC receiver according to an embodiment of the present invention.

Referring to FIG. 11, in operation S1110, the UE may calculate a DIP estimation parameter based on a covariance matrix.

The DIP estimation parameter may be the ratio between the power of diagonal elements in the covariance matrix and the power of off-diagonal elements in the covariance matrix. The DIP estimation parameter may be defined by the following equation.

$$DIP \text{ estimation parameter} = \frac{\text{power of off-diagonal elements in covariance matrix}}{\text{power of diagonal elements in covariance matrix}}$$

When the covariance matrix is $$\begin{bmatrix} r_{00} & r_{01} \\ r_{10} & r_{11} \end{bmatrix},$$

the power of diagonal elements may be $r_{00} \cdot r_{11}$ and the power of off-diagonal elements may be $|r_{01}|^2$. When the covariance matrix is $$\begin{bmatrix} r_{00} & r_{01} & r_{02} \\ r_{10} & r_{11} & r_{12} \\ r_{20} & r_{21} & r_{22} \end{bmatrix},$$

the power of diagonal elements may be $r_{00} \cdot r_{11} + r_{00} \cdot r_{22} + r_{11} \cdot r_{22}$ and the power of off-diagonal elements may be $|r_{01}|^2 + |r_{02}|^2 + |r_{12}|^2$. When the covariance matrix is $$\begin{bmatrix} r_{00} & r_{01} & r_{02} & r_{03} \\ r_{10} & r_{11} & r_{12} & r_{13} \\ r_{20} & r_{21} & r_{22} & r_{23} \\ r_{30} & r_{31} & r_{32} & r_{33} \end{bmatrix},$$

the power of diagonal elements may be $r_{00} \cdot r_{11} + r_{00} \cdot r_{22} + r_{00} \cdot r_{33} + r_{11} \cdot r_{22} + r_{11} \cdot r_{33} + r_{22} \cdot r_{33}$ and the power of off-diagonal elements may be $|r_{01}|^2 + |r_{02}|^2 + |r_{03}|^2 + |r_{12}|^2 + |r_{13}|^2 + |r_{23}|^2$.

In operation S1120, the UE may estimate a DIP based on the DIP estimation parameter. The DIP estimation parameter and the DIP may have a relationship of a one-to-one function.

In operation S1130, the UE may determine whether to use the IRC receiver based on the estimated DIP and a DIP threshold. When the estimated DIP is the DIP threshold or less, the UE may determine not to use the IRC receiver. When the estimated DIP is higher than the DIP threshold, the UE may determine to use the IRC receiver. The DIP threshold may be adjusted variously.

Figure 12:
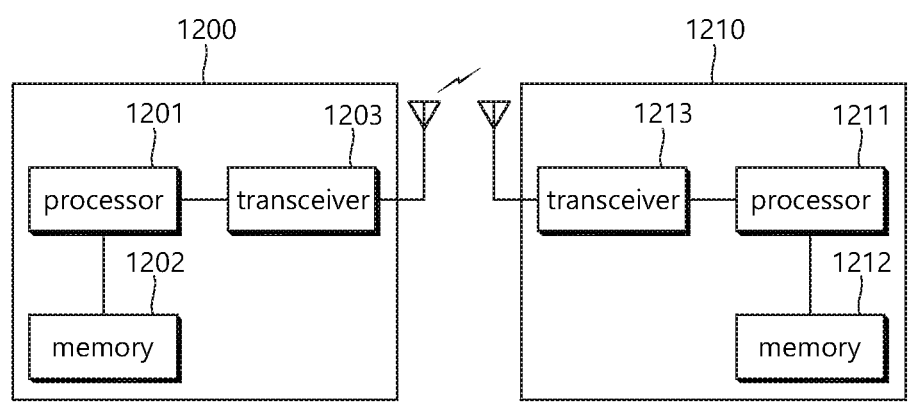
FIG. 12 is a block diagram illustrating a wireless communication system according to the embodiment of the present invention.

FIG. 12 is a block diagram illustrating a wireless communication system according to the embodiment of the present invention.

A BS 1200 includes a processor 1201, a memory 1202 and a transceiver 1203. The memory 1202 is connected to the processor 1201, and stores various information for driving the processor 1201. The transceiver 1203 is connected to the processor 1201, and transmits and/or receives radio signals. The processor 1201 implements proposed functions, processes and/or methods. In the above embodiment, an operation of the base station may be implemented by the processor 1201.

A UE 1210 includes a processor 1211, a memory 1212 and a transceiver 1213. The memory 1212 is connected to the processor 1211, and stores various information for driving the processor 1211. The transceiver 1213 is connected to the processor 1211, and transmits and/or receives radio signals. The processor 1211 implements proposed functions, processes and/or methods. In the above embodiment, an operation of the base station may be implemented by the processor 1211.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method of improving efficiency by selectively using an interference rejection combining (IRC) receiver in a wireless communication system, the method performed by a user equipment (UE) and comprising:
  calculating a dominant interferer proportion (DIP) estimation parameter based on a covariance matrix;
  estimating a DIP based on the DIP estimation parameter;
  comparing the estimated DIP with a threshold; and
  receiving a signal using the IRC receiver only if the estimated DIP is higher than the threshold.

2. The method of claim 1, wherein the DIP estimation parameter is a ratio between power of diagonal elements in the covariance matrix and power of off-diagonal elements in the covariance matrix.

3. The method of claim 2, wherein the DIP estimation parameter is calculated according to the following equation:

$$DIP \text{ estimation parameter} = \frac{\text{power of off-diagonal elements in covariance matrix}}{\text{power of diagonal elements in covariance matrix}}.$$

4. The method of claim 3, wherein the power of the diagonal elements is $r_{00} \cdot r_{11}$ and the power of the off-diagonal elements is $|r_{01}|^2$ if the covariance matrix is $$\begin{bmatrix} r_{00} & r_{01} \\ r_{10} & r_{11} \end{bmatrix}.$$

5. The method of claim 3, wherein the power of the diagonal elements is $r_{00} \cdot r_{11} + r_{00} \cdot r_{22} + r_{11} \cdot r_{22}$ and the power of the off-diagonal elements is $|r_{01}|^2 + |r_{02}|^2 + |r_{12}|^2$ if the covariance matrix is $$\begin{bmatrix} r_{00} & r_{01} & r_{02} \\ r_{10} & r_{11} & r_{12} \\ r_{20} & r_{21} & r_{22} \end{bmatrix}.$$

6. The method of claim 3, wherein the power of the diagonal elements is $r_{00} \cdot r_{11} + r_{00} \cdot r_{22} + r_{00} \cdot r_{33} + r_{11} \cdot r_{22} + r_{11} \cdot r_{33} + r_{22} \cdot r_{33}$ and the power of the off-diagonal elements is $|r_{01}|^2 + |r_{02}|^2 + |r_{03}|^2 + |r_{12}|^2 + |r_{3}|^2 + |r_{23}|^2$ if the covariance matrix is $$\begin{bmatrix} r_{00} & r_{01} & r_{02} & r_{03} \\ r_{10} & r_{11} & r_{12} & r_{13} \\ r_{20} & r_{21} & r_{22} & r_{23} \\ r_{30} & r_{31} & r_{32} & r_{33} \end{bmatrix}.$$

7. The method of claim 1, further comprising:
determining not to use the IRC receiver if the estimated DIP is not higher than the DIP.

8. The method of claim 1, wherein the DIP estimation parameter and the DIP have a one-to-one relationship.

9. The method of claim 1, wherein the threshold is varied.

10. A user equipment (UE) for improving efficiency by selectively using an interference rejection combining (IRC) receiver in a wireless communication system, the UE comprising:
a memory configured to store information;
a transceiver configured to transmit and receive information; and
a processor connected between the memory and the transceiver and configured to:
calculate a dominant interferer proportion (DIP) estimation parameter based on a covariance matrix;
estimate a DIP based on the DIP estimation parameter;
compare the estimated DIP with a threshold; and
control the transceiver to receive a signal using the IRC receiver only if the estimated DIP is higher than the threshold.

11. The UE of claim 10, wherein the DIP estimation parameter is a ratio between power of diagonal elements in the covariance matrix and power of off-diagonal elements in the covariance matrix.

12. The UE of claim 11, wherein the DIP estimation parameter is calculated according to the following equation:

$$DIP \text{ estimation parameter} = \frac{\text{power of off-diagonal elements in covariance matrix}}{\text{power of diagonal elements in covariance matrix}}.$$

13. The UE of claim 10, wherein the processor is further configured to determine not to use the IRC receiver if the estimated DIP is not higher than the DIP.

14. The UE of claim 12, wherein the power of the diagonal elements is $r00 \cdot r11$ and the power of the off-diagonal elements is $|r01|^2$ if the covariance matrix is $$\begin{bmatrix} r_{00} & r_{01} \\ r_{10} & r_{11} \end{bmatrix}.$$

15. The UE of claim 12, wherein the power of the diagonal elements is $r00 \cdot r11 + r00 \cdot r22 + r11 \cdot r22$ and the power of the off-diagonal elements is $|r01|^2 + |r02|^2 + |r12|^2$ if the covariance matrix is $$\begin{bmatrix} r_{00} & r_{01} & r_{02} \\ r_{10} & r_{11} & r_{12} \\ r_{20} & r_{21} & r_{22} \end{bmatrix}.$$

16. The UE of claim 12, wherein the power of the diagonal elements is $r00 \cdot r11 + r00 \cdot r22 + r00 \cdot r33 + r11 \cdot r22 + r11 \cdot r33 + r22 \cdot r33$ and the power of the off-diagonal elements is $|r01|^2 + |r02|^2 + |r03|^2 + |r12|^2 + |r13|^2 + |r23|^2$ if the covariance matrix is $$\begin{bmatrix} r_{00} & r_{01} & r_{02} & r_{03} \\ r_{10} & r_{11} & r_{12} & r_{13} \\ r_{20} & r_{21} & r_{22} & r_{23} \\ r_{30} & r_{31} & r_{32} & r_{33} \end{bmatrix}.$$

17. The UE of claim 10, wherein the DIP estimation parameter and the DIP have a one-to-one relationship.

18. The method of claim 10, wherein the threshold is varied.

* * * * *